US010925100B2

(12) United States Patent
Bischinger

(10) Patent No.: US 10,925,100 B2
(45) Date of Patent: Feb. 16, 2021

(54) METHOD FOR ASSIGNING A SUB-NETWORK TO A COMMUNICATION TERMINAL

(71) Applicant: DEUTSCHE TELEKOM AG, Bonn (DE)

(72) Inventor: Kurt Bischinger, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 151 days.

(21) Appl. No.: 16/067,133

(22) PCT Filed: Dec. 23, 2016

(86) PCT No.: PCT/EP2016/082654
§ 371 (c)(1),
(2) Date: Jun. 29, 2018

(87) PCT Pub. No.: WO2017/114806
PCT Pub. Date: Jul. 6, 2017

(65) Prior Publication Data
US 2019/0021125 A1 Jan. 17, 2019

(30) Foreign Application Priority Data

Dec. 30, 2015 (DE) .................... 10 2015 122 987.0
Dec. 30, 2015 (EP) .................... 15203178

(51) Int. Cl.
*H04W 76/11* (2018.01)
*H04W 8/08* (2009.01)
(Continued)

(52) U.S. Cl.
CPC ......... *H04W 76/11* (2018.02); *H04L 63/0876* (2013.01); *H04W 8/08* (2013.01);
(Continued)

(58) Field of Classification Search
CPC ....... H04W 48/18; H04W 76/11; H04W 8/08; H04W 88/06
See application file for complete search history.

(56) References Cited

U.S. PATENT DOCUMENTS

2004/0067735 A1  4/2004 Lobley
2005/0276229 A1  12/2005 Torabi
(Continued)

OTHER PUBLICATIONS

"3rd Generation Partnership Project; Technical Specification Group Services and System Aspects; Feasibility Study on New Services and Markets Technology Enablers; Stage 1 (Release 14)", 3GPP Draft; TR22 891-V120-RM, 3rd Generation Partnership Project (3GPP), Mobile Competence Centre; 650, Route Des Lucioles; F-06921 Sophia-Antipolis Cedex; France, Dec. 9, 2015 (Dec. 9, 2015), XP051071179, p. 16.
(Continued)

*Primary Examiner* — Shukri Taha
(74) *Attorney, Agent, or Firm* — Leydig, Voit & Mayer, Ltd.

(57) ABSTRACT

A method for assigning a subnetwork to a communication terminal in a communication network having a plurality of subnetworks, wherein a subnetwork identifier is assigned to each subnetwork, includes receiving an identification from the communication terminal. The identification comprises a subnetwork identifier of a particular subnetwork of the communication network. The method further includes extracting the subnetwork identifier from the received identification, selecting the particular subnetwork from the plurality of subnetworks of the communication network based on the extracted subnetwork identifier, and assigning the particular subnetwork to the communication terminal for communicating in the communication network.

15 Claims, 5 Drawing Sheets

(51) Int. Cl.
*H04W 48/18* (2009.01)
*H04L 29/06* (2006.01)
*H04W 88/06* (2009.01)
*H04W 88/10* (2009.01)

(52) U.S. Cl.
CPC ............ *H04W 48/18* (2013.01); *H04W 88/06* (2013.01); *H04W 88/10* (2013.01)

(56) References Cited

U.S. PATENT DOCUMENTS

| | | | | |
|---|---|---|---|---|
| 2006/0189298 A1* | 8/2006 | Marcelli | ............... | H04W 12/06 455/411 |
| 2009/0103468 A1* | 4/2009 | Kasapidis | ............. | H04L 12/185 370/312 |
| 2009/0270099 A1* | 10/2009 | Gallagher | ............... | H04W 8/08 455/435.1 |
| 2012/0177004 A1* | 7/2012 | Yano | ..................... | H04L 47/824 370/331 |
| 2015/0131451 A1* | 5/2015 | Iizuka | ................. | H04L 49/9057 370/241 |
| 2018/0352501 A1* | 12/2018 | Zhang | ................... | H04W 48/18 |

OTHER PUBLICATIONS

Deutsche Telekom: "Key issue: 3GPP architecture impacts to support network slicing roaming", 3GPP Draft; S2-153934_Network_Slicing_Roaming, 3rd Generation Partnership Project (3GPP), Mobile Competence Centre; 650, Route Des Lucioles; F-06921 Sophia-Antipolis Cedex; France, Bd. SA WG2, Nr. Anaheim, USA, Nov. 16, 2015-Nov. 20, 2015, Nov. 16, 2015 (Nov. 16, 2015), XP051041140.

\* cited by examiner

METHOD FOR ASSIGNING A SUB-NETWORK TO A COMMUNICATION TERMINAL

CROSS REFERENCE TO RELATED APPLICATIONS

This application is a U.S. National Stage Application under 35 U.S.C. § 371 of International Application No. PCT/EP2016/082654 filed on Dec. 23, 2016, and claims benefit to German Patent Application No. DE 10 2015 122 987.0 filed on Dec. 30, 2015, and European Patent Application No. EP 15203178.7 filed on Dec. 30, 2015. The International Application was published in German on Jul. 6, 2017 as WO 2017/114806 A1 under PCT Article 21(2).

FIELD

The present invention relates to a method for assigning a subnetwork to a communication terminal in a communication network having a plurality of subnetworks, in particular in a 5G communication network having a plurality of slices. The invention also relates to a base station for communicating via a plurality of subnetworks of a communication network and to a communication terminal for communicating via a subnetwork of a plurality of subnetworks.

BACKGROUND

The fifth generation of mobile technology (5G) relates to the requirements and technical challenges of the future communication networks from approximately 2020 and beyond. A completely mobile and networked society characterized by an enormous growth in data traffic and mutual networking on a plurality of levels is addressed thereby.

New radio interfaces are required in 5G in order to meet the requirements imposed on the use of higher frequencies, for example for new applications such as the Internet of Things (IoT), special capabilities, for example a shorter propagation time, which go beyond that which 4G communication networks are capable of achieving. In this case, 5G is considered to be an end-to-end system which comprises all network aspects with a design which enables a high degree of convergence. 5G will make full use of the current access mechanisms and their possible further developments, including the current fixed network access technologies of many other access technologies yet to be developed.

5G will operate in a highly heterogeneous environment, that is to say with a plurality of types of access technologies, multi-layer networks, various types of communication devices and user interactions etc. A wide variety of applications with diametrical requirements are intended to be optimally supported, for example failsafe robust communication, communication with low data rates or broadband communication in densely populated areas. In such an environment, there is a fundamental demand for 5G in order to accomplish a seamless and consistent user experience over time and space. For the operator of a 5G communication network, it is necessary to adapt the resources used to the respective requirements in an optimum and dynamic manner in order to be able to simultaneously support the multiplicity of applications.

Therefore, in 5G, there is a need, on the one hand, to increase the communication performance, in particular to provide a higher data throughput, a shorter delay, particularly high reliability, a far higher connection density and a larger mobility area, but, on the other hand, to also increase the flexibility during operation and to provide tailor-made functions with the lowest possible use of means. This increased performance is expected together with the capability to control highly heterogeneous environments and the capability to safeguard the confidentiality, identity and privacy of the users.

SUMMARY

In an embodiment, the present invention provides a method for assigning a subnetwork to a communication terminal in a communication network having a plurality of subnetworks, wherein a subnetwork identifier is assigned to each subnetwork. The method includes receiving an identification from the communication terminal, wherein the identification comprises a subnetwork identifier of a particular subnetwork of the communication network; extracting the subnetwork identifier from the received identification; selecting the particular subnetwork from the plurality of subnetworks of the communication network based on the extracted subnetwork identifier; and assigning the particular subnetwork to the communication terminal for communicating in the communication network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide for increasing the communication performance and flexibility, in particular in 5G, with respect to the requirements discussed in the preceding background section.

Embodiments of the present invention provide methods and systems of various types. Various individual elements described herein below can be implemented by hardware or software components, for example electronic components which can be produced by means of various technologies and comprise, for example, semiconductor chips, ASICs, microprocessors, digital signal processors, integrated electrical circuits, electro-optical circuits and/or passive components.

The devices, systems and methods presented below are suitable for transmitting information via a communication network. In this case, the term communication network denotes the technical infrastructure on which signals are transmitted. The communication network comprises substantially the switching network, in which the signals are transmitted and switched between the stationary devices and platforms of the mobile radio network or fixed network, and the access network, in which the signals are transmitted between a network access device and the communication terminal. In this case, the communication network may comprise both components of a mobile radio network and components of a fixed network. In the mobile radio network, the access network is also referred to as an air interface and comprises, for example, a base station (NodeB, eNodeB, radio cell) with a mobile radio antenna in order to establish communication to a communication terminal, for example a mobile telephone or a smartphone or a mobile device with a mobile radio adapter. In the fixed network, the access network comprises, for example, a DSLAM (digital subscriber line access multiplexer) in order to connect the communication terminals of a plurality of subscribers in a wired or cabled manner. Communication can be passed on to further networks, for example of other network operators, for example international networks, via the switching network.

Figure 1:
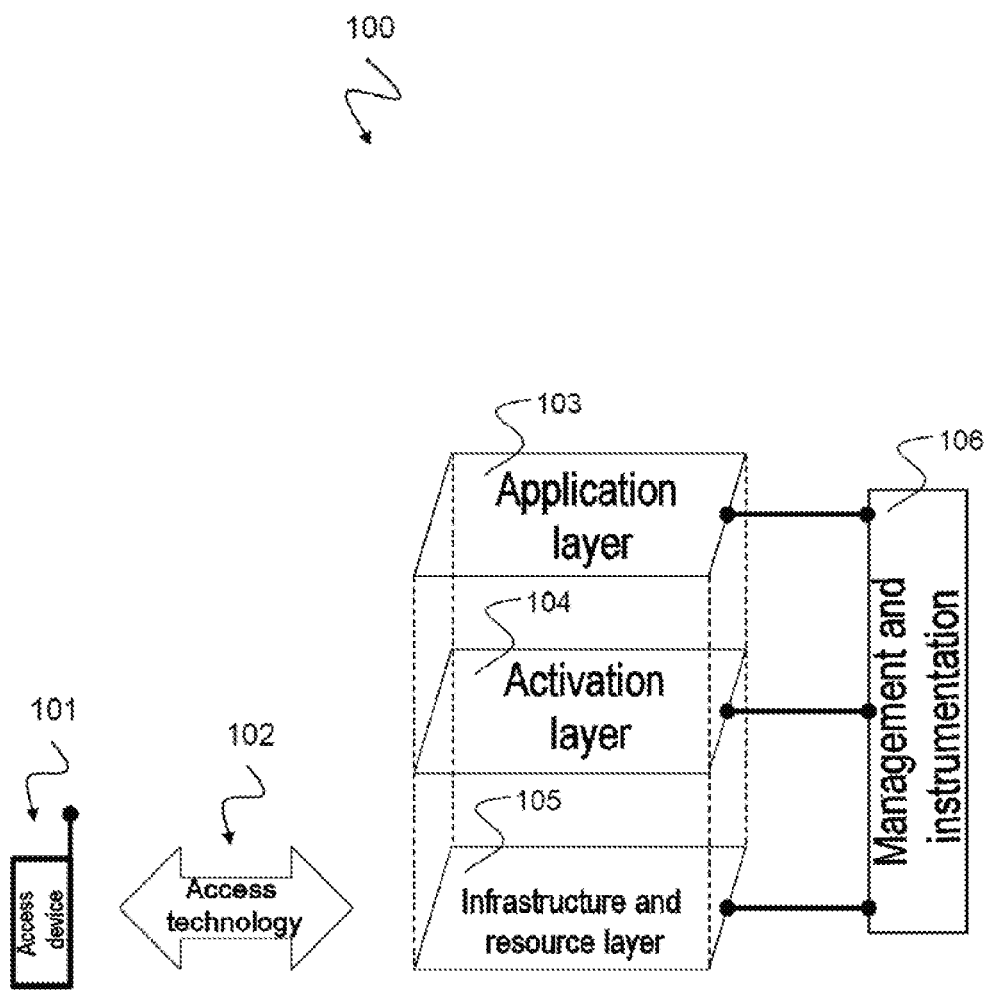
FIG. 1 shows a schematic illustration of a 5G system architecture 100.

The devices, systems and methods presented below are intended to enhance communication in communication networks, in particular in communication networks according to the 5G system architecture are presented below. FIG. 1 shows a schematic illustration of such a 5G system architecture 100. The 5G system architecture 100 comprises an area having 5G communication terminals 101 which are connected, via various access technologies 102, to a multi-layer communication structure comprising an infrastructure and resource layer 105, an activation layer 104 and an application layer 103 which are managed via a management and instrumentation level 106.

The infrastructure and resource layer 105 comprises the physical resources of a convergent network structure comprising fixed network and mobile radio network components ("fixed-mobile convergence") with access nodes, cloud nodes (comprising processing and storage nodes), 5G devices, for example mobile telephones, portable devices, CPE, machine communication modules and others, network nodes and associated links. 5G devices may comprise various and configurable capabilities and may act as a relay or a hub, for example, or may operate as a computer/storage resource depending on the respective context. These resources are made available to the higher layers 104, 103 and to the management and instrumentation level 106 via corresponding APIs (application programming interfaces). The process of monitoring the performance and the configurations is an inherent part of such APIs.

The activation layer 104 comprises a library of functions which are required inside a converged network in the form of modules of a modular architecture. These comprise functions which are implemented by means of software modules, which can be retrieved from a storage place of the desired location, and a set of configuration parameters for particular parts of the network, for example radio access. These functions and capabilities can be called on request by the management and instrumentation level 106 by using the APIs provided for this purpose. Numerous variants may exist for particular functions, for example various implementations of the same functionality which have a different performance or characteristic. The various degrees of performance and the capabilities offered can be used to distinguish the network functionalities to a considerably greater extent than is possible in current networks, for example to offer a nomadic mobility, a vehicle mobility or an air traffic mobility as a mobility function on the basis of the specific needs.

The application layer 103 comprises specific applications and services of the network operator, of the company, of the vertical operator or of third parties using the 5G network. The interface to the management and instrumentation level 106 allows, for example, particular, that is to say dedicated, network slices to be established for an application or allows an application to be allocated to an existing network slice.

The management and instrumentation level 106 is the contact point in order to convert the required use cases (also business models) into actual network functions and slices. It defines the network slices for a given application scenario, concatenates the modular network functions relevant thereto, assigns the relevant performance configurations and maps everything to the resources of the infrastructure and resource layer 105. The management and instrumentation level 106 also manages the scaling of the capacity of these functions and their geographical distribution. In particular use cases, it may also have capabilities which allow third parties to generate and manage their own network slices by using the APIs. On account of the numerous tasks of the management and instrumentation level 106, this is not a monolithic block of functionality but rather a collection of modular functions which integrate advances which have been achieved in various network domains, for example NFV ("network function virtualization"), SDN ("software-defined networking") or SON ("self-organizing networks"). The management and instrumentation level 106 uses data-aided intelligence to optimize all aspects of service arrangement and provision.

Figure 2:
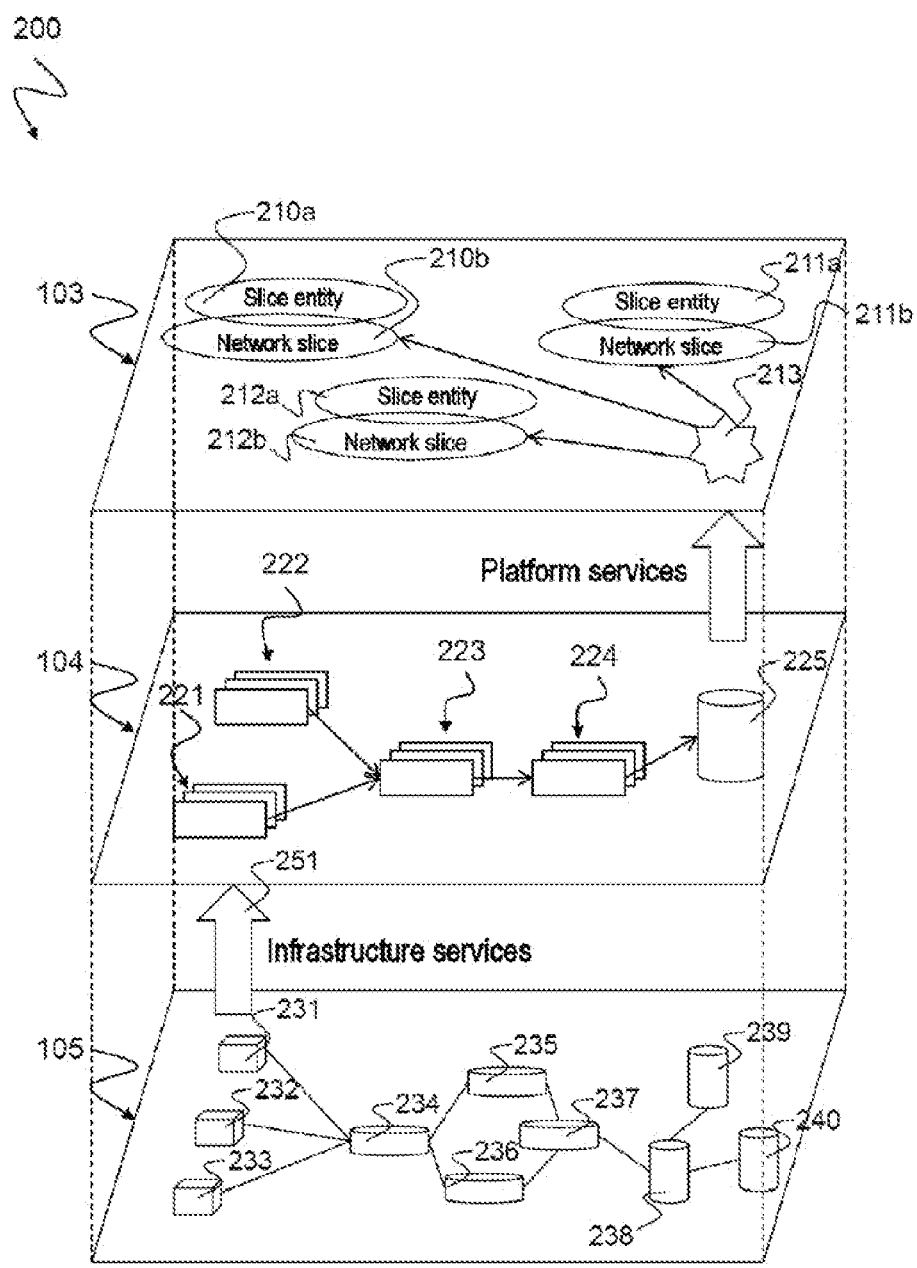
FIG. 2 shows a schematic illustration of a 5G communication network having a plurality of slices 200.

The devices, systems and methods presented here are intended to improve communication in communication networks, in particular in 5G communication networks having a plurality of network slices, as described below. FIG. 2 shows a schematic illustration of a 5G communication network 200 having a plurality of network slices. The 5G communication network 200 comprises an infrastructure and resource layer 105, an activation layer 104 and an application layer 103.

The infrastructure and resource layer 105 comprises all physical assets assigned to a network operator, that is to say sites, cables, network nodes etc. This layer 105 forms the basis for all network slices. It is constructed as generically as possible without too many specialized physical units. The infrastructure and resource layer 105 conceals any type of user-specific implementation from the upper layers, with the result that the remaining systems can be used in the best possible manner for different slices. Components of the infrastructure and resource layer 105 are based on hardware and software or firmware which is required for the respective operation and is made available in this case as an infrastructure and resource layer 105 to the layers above as resource objects. For example, objects of the infrastructure and resource layer 105 comprise virtual machines, virtual links or connections and virtual networks, for example virtual access nodes 231, 232, 233, virtual network nodes 234, 235, 236, 237 and virtual computer nodes 238, 239, 240. As the term "virtual" already states, the infrastructure and resource layer 105 provides the objects in the form of an "infrastructure as a service" 251, that is to say in an abstracting, virtualized form, to the next higher layer 104.

The activation layer 104 is arranged above the infrastructure and resource layer 105. It uses the objects of the infrastructure and resource layer 105 and adds additional functionality thereto in the form of (for example non-physical) software objects/VNFs in order to make it possible to generate any type of network slices and thus to provide a platform as a service to the next higher layer 103.

Software objects can exist in any granularity and can comprise a tiny or a very large fragment of a network slice. In order to allow network slices to be generated on a suitable abstraction level, various abstracted objects 221 can be combined with other abstracted objects and with virtual network functions 222 in the activation layer 104 in order to form combined objects 223 which can be converted into aggregated objects 224 and are made available to the next higher level in an object library 225. The complexity can therefore be hidden behind the network slices. For example, a user can generate a mobile broadband slice and in the process can define only a KPI (Key Performance Indicator) without having to specify specific features such as individual local antenna coverage, backhaul connections and specific degrees of parameterization. In order to support an open environment and to allow network functions to be added or deleted on request, an important capability of the activation layer 104 is that it supports the dynamic rearrangement of functions and connectivities in a network slice, for example by using SFC ("Service Function Chaining") or modifying software, with the result that the functionality of a slice can be completely predefined and can comprise both approximately static software modules and software modules which can be dynamically added.

In this case, a network slice can be considered to be a software-defined entity which is based on a set of objects which define a complete network. The activation layer 104 plays a key role in the success of this concept since it can comprise all software objects which are needed to provide the network slices and the corresponding skills for handling the objects. The activation layer 104 can be considered to be a type of network operating systems complemented by a network generation environment. An important task of the activation layer 104 is to define the corresponding abstraction levels. Network operators therefore have sufficient freedom to design their network slices, while the platform operator can still maintain and optimize the physical nodes. For example, the performance of the daily tasks, such as the addition or replacement of NodeBs etc., is supported without the intervention of the network customers. The definition of suitable objects which model a complete telecommunication network is one of the important tasks of the activation layer 104 when developing the network slice environment.

A network slice, also referred to as a 5G slice, supports the communication services of a particular connection type with a particular way of handling the C (control) and U (user data) layer. A 5G slice is composed of a collection of different 5G network functions and specific radio access technology (RAT) settings which are together combined to use the specific use case. Therefore, a 5G slice can span all domains of the network, for example software modules which run on cloud nodes, specific configurations of the transport network which support a flexible location of the functions, a particular radio configuration or even a particular access technology as well as a configuration of the 5G devices. Not all slices contain the same functions; some functions which nowadays appear to be essential for a mobile network may not even occur in some slices. The intention of the 5G slice is to provide only the functions which are required for the specific use case and to avoid all other unnecessary functionalities. The flexibility behind the slice concept is the key both for expanding existing use cases and for generating new use cases. Third-party devices can therefore be granted permission to control particular aspects of the slicing via suitable APIs in order to thus be able to provide tailor-made services.

The application layer 103 comprises all generated network slices 210b, 211b, 212b and offers these as a "network as a service" to various network users, for example various customers. The concept allows the reuse of defined network slices 210b, 211b, 212b for various users, for example customers, for example as a new network slice entity 210a, 211a, 212a. That is to say, a network slice 210b, 211b, 212b which is assigned to an automotive application, for example, can also be used for applications of various other industrial applications. The slice entities 210a, 211a, 212a which have been generated by a first user can be independent of the slice entities which have been generated by a second user, for example, even though the entire network slice functionality may be the same.

According to embodiments of the invention, the methods are provided for assigning a subnetwork to a communication terminal in a communication network having a plurality of subnetworks, wherein a subnetwork identifier is assigned to each subnetwork, comprising: receiving an identification from the communication terminal, wherein the identification comprises a subnetwork identifier of a particular subnetwork of the communication network; extracting the subnetwork identifier from the received identification; selecting the particular subnetwork from the plurality of subnetworks of the communication network on the basis of the extracted subnetwork identifier; and assigning the particular subnetwork to the communication terminal for communicating in the communication network.

The communication performance can be increased on account of the subnetwork structure of the communication network. In particular, a higher data throughput, a shorter delay, particularly high reliability, a far higher connection density and a larger mobility area can be obtained thereby. Together with an increased performance, highly heterogeneous environments can be controlled using the method along with the capability to safeguard the confidentiality, identity and privacy of the users.

According to one embodiment, the method comprises establishing an end-to-end communication connection of the communication terminal via the particular subnetwork.

This has the advantage that all network aspects are included with a high degree of convergence with such an end-to-end communication connection. The existing access mechanisms and their possible further developments can likewise be used further.

According to one embodiment of the method, the communication network is a network of a fifth generation (5G) or of a further generation, and the subnetworks are slices of the communication network.

This makes it possible to achieve all advantages of the 5G network structure, as described above with respect to FIGS. 1 and 2, for example higher radio frequencies with a higher data throughput, new applications, for example the Internet of Things, special capabilities, for example a shorter propagation time, which go beyond that which 4G communication networks are capable of achieving. The communication network may provide an end-to-end system which comprises all network aspects with a high degree of convergence. Furthermore, the existing access mechanisms and their possible further developments can be fully used.

According to one embodiment of the method, the identification comprises at least one of the following identifications: an International Mobile Subscriber Identity (IMSI), wherein the subnetwork identifier is arranged in the Mobile Subscriber Identification Number field or in the Mobile Network Code field of the IMSI; an eID containing the subnetwork identifier in an eSIM in the communication terminal; a network identifier of the communication network containing the subnetwork identifier; an International Mobile Station Equipment Identity containing the subnetwork identifier.

This has the advantage that the method can carry out an assignment to a subnetwork on the basis of a plurality of identifiers, for example an IMSI, an IMEI or an eID of a communication service, which provides a higher degree of flexibility.

Subnetworks can be assigned to different applications or services, with the result that the communication terminal can communicate via a plurality of subnetworks on the further basis thereof. The subnetworks differ from one another by virtue of different functions, services or applications.

According to one embodiment of the method, the communication network contains a base station which controls communication via the subnetworks of the communication network, and the steps of receiving the identification, extracting the subnetwork identifier, selecting the particular subnetwork and assigning the particular subnetwork to the communication terminal are carried out by the base station.

This has the advantage that the communication terminals can be mobile and their communication requests are forwarded to the respective identification entities of the subnetworks via the base station, for example an eNodeB.

According to one embodiment of the method, each subnetwork contains an identification entity for identifying the communication terminal, which identification entity is connected to the base station using communication technology, and the method comprises the following steps of: forwarding the received identification from the base station to the identification entity of the particular subnetwork; and identifying the communication terminal by means of the identification entity of the particular subnetwork.

This has the advantage that the communication terminals need not know in this case which subnetwork they are assigned to; it suffices to make a connection request via the base station in order to be allocated to a corresponding subnetwork.

According to one embodiment of the method, the communication network contains a management entity which manages communication via the subnetworks of the communication network, and the identification entity of the particular subnetwork forwards the identification of the communication terminal to the management entity, and the management entity authenticates the communication terminal for communicating via the particular subnetwork.

This has the advantage of efficient communication since a central management entity can authenticate the respective communication terminal and can allocate the corresponding subnetwork to said communication terminal. The complexity can therefore be hidden behind the subnetworks in the management entity.

According to one embodiment of the method, after the communication terminal has been authenticated for communication via the particular subnetwork, a communication connection of the communication terminal is established via the particular subnetwork by means of the identification entity of the particular subnetwork.

This has the advantage that each subnetwork can independently establish a communication connection to the communication terminal if the communication terminal is authenticated for that purpose.

According to embodiments of the invention, base stations are provided for communicating via a plurality of subnetworks of a communication network, wherein a subnetwork identifier is assigned to each subnetwork. The base stations include a communication interface for receiving an identification from the communication terminal, wherein the identification comprises a subnetwork identifier of a particular subnetwork of the communication network; and a processor which is configured to extract the subnetwork identifier from the received identification, to select the particular subnetwork from the plurality of subnetworks of the communication network and to assign the particular subnetwork to the communication terminal for communicating in the communication network.

The performance of communicating with the communication terminal can be increased on account of the subnetwork structure of the communication network. In particular, the base station can therefore switch the respective communication request to the corresponding subnetwork and can therefore obtain a higher data throughput, a shorter delay, high reliability, a higher connection density and greater mobility. The base station can also be used in highly heterogeneous environments and can forward the data traffic to the correspondingly selected subnetwork.

According to one embodiment of a base station, the processor is configured to select the particular subnetwork from the plurality of subnetworks on the basis of a look-up table.

This has the advantage of fast and efficient selection of the particular subnetwork.

According to embodiments of the invention, communication terminals are provided for communicating via a subnetwork of a communication network having a plurality of subnetworks, wherein a subnetwork identifier is assigned to each subnetwork. The communication terminals include a hardware circuit for providing an identification of the communication terminal, wherein the identification comprises a subnetwork identifier of a particular subnetwork of the communication network which is assigned to the communication terminal.

The performance of communicating with the communication terminal can be increased on account of the subnetwork structure of the communication network. In particular, the communication request can be quickly forwarded by the communication terminal as a result of the identification of the communication terminal being provided together with the subnetwork identifier. This then makes it possible to achieve a high data throughput, a short delay, high reliability, and a high connection density.

According to one embodiment, a communication terminal comprises a communication interface which is configured to emit a connection request to establish communication via the particular subnetwork together with the identification.

This has the advantage that the connection request can be answered quickly if both the particular subnetwork and the identification of the communication terminal are contained therein since an assignment of the communication terminal both to the communication network and to the respective subnetwork is then known and no complicated routing must take place.

According to one embodiment of a communication terminal, the communication network is a network of a fifth generation (5G) or of a further generation, and the subnetworks are slices of the communication network, and the communication terminal is configured to communicate via the slice determined for the communication terminal.

This makes it possible to achieve all advantages of the 5G network structure, as described above with respect to FIGS. 1 and 2, for example higher radio frequencies with a higher data throughput, new applications, for example the Internet of Things, special capabilities, for example a shorter propagation time, which go beyond that which 4G communication networks are capable of achieving. The communication network may provide an end-to-end system which comprises all network aspects with a high degree of convergence. Furthermore, the existing access mechanisms and their possible further developments can be fully used.

According to one embodiment of a communication terminal, the hardware circuit implements at least one of the following identifications: an International Mobile Subscriber Identity (IMSI), wherein the subnetwork identifier is arranged in the Mobile Subscriber Identification Number field or in the Mobile Network Code field of the IMSI; an eID (embedded identifier) containing the subnetwork identifier in an eSIM (embedded subscriber identity module) in the communication terminal; a network identifier of the communication network containing the subnetwork identifier; an International Mobile Station Equipment Identity containing the subnetwork identifier.

This has the advantage that the communication terminal can be assigned to a subnetwork on the basis of a plurality of identifiers, for example an IMSI, IMEI or eID, which provides a higher degree of flexibility.

Subnetworks can be assigned to different applications or services, with the result that the communication terminal can communicate via a plurality of subnetworks on the further basis thereof. The subnetworks differ from one another by virtue of different functions, services or applications.

In the following detailed description, reference is made to the accompanying drawings which form a part thereof and which show, as an illustration, specific embodiments in which the invention can be carried out. It goes without saying that other embodiments can also be used and structural or logical changes can be made without departing from the concept of the present invention. The following detailed description should therefore not be understood in a restrictive sense. It also goes without saying that the features of the various exemplary embodiments described herein can be combined with one another unless specifically stated otherwise.

The aspects and embodiments are described with reference to the drawings, wherein identical reference signs generally relate to identical elements. Numerous specific details are stated in the following description for the purposes of explanation in order to provide an in-depth understanding of one or more aspects of the invention. However, it may be obvious to a person skilled in the art that one or more aspects or embodiments can be implemented with a lower degree of the specific details. In other cases, known structures and elements are illustrated in a schematic form in order to facilitate the description of one or more aspects or embodiments. It goes without saying that other embodiments can be used and structural or logical changes can be made without departing from the concept of the present invention.

Even though a particular feature or a particular aspect of an embodiment may have been disclosed with respect to only one of a plurality of implementations, such a feature or such an aspect can also be combined with one or more other features or aspects of the other implementations, as may be desirable and advantageous for a given or particular application. Furthermore, to the extent to which the expressions "contain", "have", "having" or other variants thereof are used either in the detailed description or in the claims, such expressions are intended to be inclusive in a manner similar to the expression "comprise". The expressions "coupled" and "connected" may have been used together with derivatives thereof. It goes without saying that such expressions are used to state that two elements cooperate or interact with one another irrespective of whether they are in direct physical or electrical contact or are not in direct contact with one another. In addition, the expression "by way of example" should be interpreted only as an example instead of denoting the best or optimum case. The following description should therefore not be understood in a restrictive sense.

Figure 3:
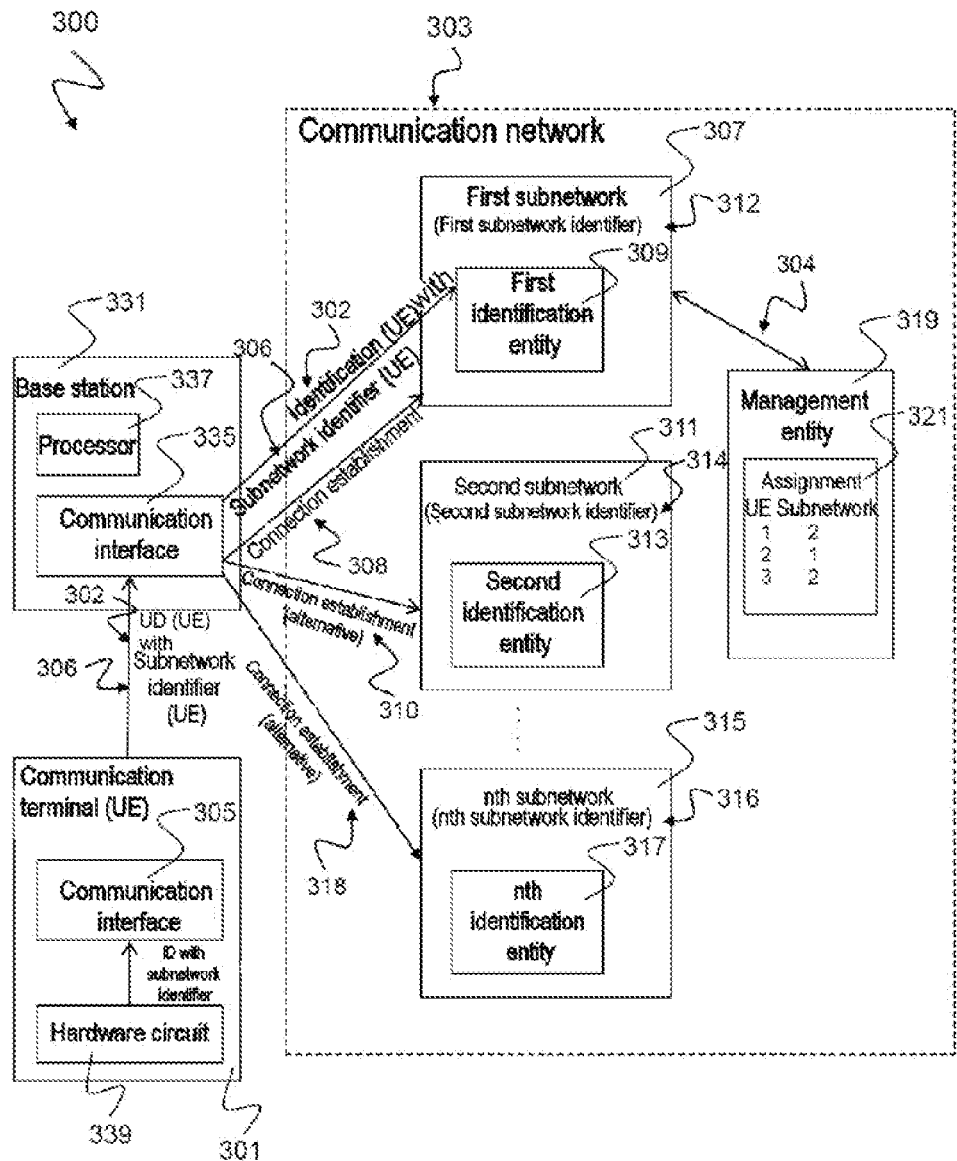
FIG. 3 shows a schematic illustration of a communication system 300 having a communication terminal 301, a base station 331 and a communication network 303 according to an embodiment of the invention.

FIG. 3 shows a schematic illustration of a communication system 300 having a communication terminal 301, a base station 331 and a communication network 303 according to one exemplary embodiment.

The communication terminal 301 comprises a communication interface 305 in order to interchange messages with the communication network 303 and to establish a connection of the communication terminal 301 to or via the communication network 303.

The communication network 303 comprises a plurality of subnetworks 307, 311, 315 having a first subnetwork 307, a second network 311 and further subnetworks, of which an nth subnetwork 315 is illustrated by way of example. This plurality of subnetworks corresponds to a plurality of slices 210b, 211b, 212b, as described above with respect to FIG. 1 and FIG. 2. A first identification entity 309 which can be used to identify the communication terminal 301 is arranged in the first subnetwork 307. A second identification entity 313 which can be used to identify the communication terminal 301 is arranged in the second subnetwork 311. The same applies to the further subnetworks, that is to say an nth identification entity 317 which can be used to identify the communication terminal 301 is arranged in the nth subnetwork 315.

Each subnetwork 307, 311, 315 of the communication network 303 is assigned a subnetwork identifier 312, 314, 316 which identifies the corresponding subnetwork. The communication network 303 also comprises a management entity 319 which manages an assignment 321 of the communication terminal 301 to one of the subnetworks 307, 311, 315.

The communication terminal 301 is designed to communicate via a subnetwork of the communication network 303 having a plurality of subnetworks 307, 311, 315, wherein a subnetwork identifier 312, 314, 316 is assigned to each subnetwork 307, 311, 315.

The communication terminal 301 comprises a hardware circuit 339 for providing an identification 302 of the communication terminal 301. The identification 302 comprises a subnetwork identifier 306 of a particular subnetwork of the communication network 303 which is assigned to the communication terminal 301, for example of the first subnetwork 307.

The communication terminal 301 also comprises a communication interface 305 which is designed to emit a connection request 308 to establish communication via the particular subnetwork 307 together with the identification 302.

The communication network 303 may be a network of a fifth generation (5G) or of a further generation, for example as described above with respect to FIGS. 1 and 2. The subnetworks 307, 311, 315 may be slices of the communication network 303, for example as described above with respect to FIG. 2. The communication terminal 301 can communicate via the slice determined for the communication terminal 301.

The hardware circuit 339 may implement one or more of the following identifications: an International Mobile Subscriber Identity (IMSI), wherein the subnetwork identifier 306 can be arranged in the Mobile Subscriber Identification Number field or in the Mobile Network Code field of the IMSI; an eID containing the subnetwork identifier 306 in an eSIM in the communication terminal 301; a network identifier of the communication network 303 containing the subnetwork identifier 306; an International Mobile Station Equipment Identity containing the subnetwork identifier 306.

The base station 331 is designed to communicate via a plurality of subnetworks 307, 311, 315 of the communication network 303, wherein a subnetwork identifier 312, 314, 316 is assigned to each subnetwork 307, 311, 315.

The base station 331 comprises a communication interface 335 and a processor 337. The communication interface 335 is designed to receive an identification 302 from the communication terminal 301. The identification 302 comprises a subnetwork identifier 306 of a particular subnetwork of the communication network 303.

The processor 337 is designed to extract the subnetwork identifier 306 from the received identification 302, to select the particular subnetwork from the plurality of subnetworks 307, 311, 315 of the communication network 303 and to assign the particular subnetwork to the communication terminal 301 for communication in the communication network 303.

The processor 337 is also designed to select the particular subnetwork from the plurality of subnetworks 307, 311, 315 on the basis of a look-up table. The look-up table may be arranged in the base station 331.

The communication interface 305 of the communication terminal 301 is designed to emit, via the base station 331, an identification 302 of the communication terminal 301 to the first identification entity 309 of the first subnetwork 307 in order to initiate connection establishment 308 via the first subnetwork 307.

With respect to the communication network 303, communication can be established as described below.

The base station 331 receives an identification 302 of the communication terminal 301 with a subnetwork identifier 306, which corresponds to the subnetwork identifier 312 of the particular subnetwork 307, and initiates the establishment of a connection 308 to the identification entity 309 of the particular subnetwork 307. The identification entity 309 receives an identification 302 of the communication terminal 301. This identification 302 identifies the communication terminal 301. The first identification entity 309 identifies the communication terminal 301 on the basis of this identification 302. In this case, the tasks of this first identification entity 309 can correspond to or comprise those of an MME (Mobility Management Entity) in the LTE network. The identification can be carried out on the basis of an IMSI or a temporary identification feature of the communication terminal 301, for example a UE, linked thereto.

A subnetwork is then assigned by the management entity 319 on the basis of the assignment 321 of a subnetwork identifier 306 to the communication terminal 301.

This is followed by the establishment of a communication connection 308 of the communication terminal 301 via the first subnetwork 307 if the subnetwork identifier 306 assigned to the identification 302 of the communication terminal 301 corresponds to the subnetwork identifier 312 of the first subnetwork 307. Alternatively, the establishment of a communication connection 310 of the communication terminal 301 via the second subnetwork 311 or via another of the subnetworks, for example a communication connection 318 via the nth subnetwork 315, follows if the subnetwork identifier 306 assigned to the transmitted identification 302 and the subnetwork identifier 312 of the first subnetwork 307 are different or if the subnetwork identifier 306 assigned to the transmitted identification 302 corresponds to the subnetwork identifier 312 of the second subnetwork 311 or of the nth subnetwork 315.

In this case, the tasks of the management entity 319 may correspond to or comprise those of an HSS (Home Subscriber Server) in the LTE (Long Term Evolution) network, that is to say the following procedure for establishing a connection can take place in the communication network 303.

The management entity 319 first of all creates parameters which are required for authentication and subsequently for security-relevant processes such as encryption and protection of the integrity of the messages. These parameters may be a random value RAND, a key $K_{ASME}$, the expected result of the authentication check XRES and the authentication token AUTN. These four parameters can be sent from the management entity 319 to the corresponding subnetwork 307 as a so-called authentication vector.

RAND and AUTN may be transmitted from the first identification entity 309, for example via a first communication node 331, for example an eNodeB (base station), to the communication terminal 301, for example a UE (User Equipment). The first communication node 331 may be arranged in this case between the communication terminal 301 and the first subnetwork 307 in order to enable communication between the communication terminal 301 and the first identification entity 309. The first communication node 331 can also be connected to further subnetworks 311, 315 in order to enable communication between the communication terminal 301 and further subnetworks 311, 315. The first communication node can be reached by the communication terminal 301, for example using RAT (Radio Access Technology), for example WLAN, WiFi, mobile radio air interface, etc.

The communication terminal 301 can likewise derive some parameters, for example the $K_{ASME}$, from a secret key stored on the UICC, which parameters allow the communication terminal to check the authenticity of the communication network 303 with the aid of the AUTN and to calculate the value RES from RAND and $K_{ASME}$ using a particular algorithm. This value can then be sent to the first identification entity 309, for example via the first communication node 331. If RES and XRES are the same, the first identification entity 309 sends a message to the management entity 319 in order to inform the latter that the authentication of the communication terminal 301 has been positively concluded. The management entity can then send a list for this communication terminal 301 with permitted connections (PDN Subscription Contexts with QoS profiles) to the first identification entity 309.

The first identification entity 309 can then establish a default carrier (for example an IP connection) from the communication terminal 301, for example via a Serving Gateway (S-GW), to a Packet Data Network Gateway (PDN-GW) and can inform the communication terminal 301 of the successful registration process.

The communication terminal 301 can now communicate via the communication network 303. Further connection requests from the PDN-GW or the communication terminal 301 for additional carriers or modifications of the existing carriers can be authorized by the first identification entity 309 on the basis of the data received from the management entity 319.

The communication connection 310 can be established via the second subnetwork 311 if the subnetwork identifier 306 assigned to the transmitted identification 302 is the subnetwork identifier 314 of the second subnetwork 311.

Alternatively, the communication connection 310 can be established via the nth subnetwork 315 if the subnetwork identifier 306 assigned to the transmitted identification 302 is the subnetwork identifier 316 of the nth subnetwork 315.

The communication network 303 may be a network of a fifth generation (5G) or of a further generation, and the subnetworks 307, 311, 315 may be slices of the communication network 303, as described above with respect to FIGS. 1 and 2.

The management entity 319 can assign 321 the subnetwork identifier 306 to the communication terminal 301 on the basis of one or more of the following assignments: an assignment of the identification 302 of the communication terminal 301, for example a hardware identifier of the communication terminal 301 such as an IMSI or an IMEI or an eID, to the subnetwork identifier 306 and/or an assignment of a communication service to the communication terminal 301 and/or an assignment of a software application to the communication terminal 301 and/or an assignment of an operating system of the communication terminal 301 to one of the two subnetworks 307, 311.

Subnetworks may be assigned to different applications or services, with the result that the communication terminal 301 can communicate via a plurality of subnetworks 307, 311, 315 on the further basis thereof. The subnetworks may differ from one another by virtue of different functions, services or applications.

In addition to assigning (a) communication terminal(s) 301 to a subnetwork identifier, the management entity 319 may also comprise an assignment of subnetwork identifiers 312, 314, 316 to subnetworks 307, 311, 315, which may be stored in a table or a memory of the management entity 319, for example.

The communication terminal 301 can transmit the identification 302 of the communication terminal 301 to the first identification entity 309 or to the second identification entity 313, together with the subnetwork identifier 306 which indicates the subnetwork 307, 311, 315 assigned to the communication terminal 301, to the first identification entity 309 or to the other identification entities 313, 317. In response, the first identification entity 309 can transmit the identification 302 of the communication terminal 301 and the subnetwork identifier 312 of the first subnetwork 307 to the management entity 319. The same functionality also applies to the other identification entities 313, 317.

When assigning a subnetwork to the communication terminal 301, the management entity 319 can transmit the subnetwork identifier 306 assigned to the identification 302 of the communication terminal 301 to the first identification entity 309. If the subnetwork identifier 306 assigned to the identification 302 of the communication terminal 301 and the subnetwork identifier 312 of the first subnetwork 307 are different, the first identification entity 309 can transmit the transmitted subnetwork identifier 306 to the communication terminal 301. If the subnetwork identifier 306 assigned to the identification 302 of the communication terminal 301 and the subnetwork identifier 312 or the first subnetwork 307 are different, the first identification entity 309 can transmit the transmitted subnetwork identifier 306 to the second identification entity 313.

When establishing the communication connection 310 via the second subnetwork 311, the communication terminal 301 can transmit the identification 302 to the second identification entity 313.

When establishing the communication connection 310 via the second subnetwork 311, the second identification entity 313 can identify the communication terminal 301 on the basis of the identification 302 of the communication terminal 301. The following steps can be carried out after the communication terminal 301 has been identified: assigning a subnetwork 307, 311, 315 to the communication terminal 301 by means of the management entity 319 on the basis of the assignment 321 of a subnetwork identifier to the communication terminal 301; and establishing a communication connection 310 of the communication terminal via the second subnetwork 311 if the subnetwork identifier 306 assigned to the identification 302 of the communication terminal 301 corresponds to the subnetwork identifier 314 of the second subnetwork 311. Alternatively, a communication connection 318 of the communication terminal 301 can be established via a further subnetwork 315 of the communication network 303 or the communication terminal 301 can be rejected if the subnetwork identifier 306 assigned to the identification 302 of the communication terminal 301 and the subnetwork identifier 314 of the second subnetwork 311 are different.

The connection can be established recursively here. That is to say, an attempt is first of all made to establish communication via the first subnetwork 307. If this is not possible on account of an unsuitable subnetwork identifier 306 of the communication terminal 301, an attempt is made to establish communication via the second subnetwork 311. If this is also not possible on account of an unsuitable subnetwork identifier 306 of the communication terminal 301, an attempt is made to establish communication via a further subnetwork, for example the nth subnetwork 315. If this last communication establishment is not possible on account of an unsuitable subnetwork identifier 306 of the communication terminal 301, communication establishment is rejected. Alternatively, communication establishment can also be rejected even earlier, for example after the first, second, third, nth unsuccessful attempt.

When establishing the respective communication connection 308, 310, 318, the communication terminal 301 can transmit the subnetwork identifier 306 assigned to the transmitted identification 302 to the first identification entity 309 or the second identification entity 313.

The base station 331, the respective identification entity 309, 313 or the management entity 319 can assign a subnetwork 307, 311, 315 of the communication network 303 to the communication terminal 301 on the basis of the transmitted subnetwork identifier 306 if the transmitted subnetwork identifier 306 indicates a subnetwork of another communication network, for example a foreign network, via which roaming is intended to be carried out. In this case, the base station 331, the respective identification entity 309, 313 or the management entity 319 can assign that subnetwork 307, 311, 315 of the communication network 303 which corresponds to the subnetwork of the other communication network to the communication terminal 301. The subnetworks in different communication networks may have different identifiers. When accordingly assigning the subnetwork in the communication network 303 to the communication terminal 301 which corresponds to the corresponding subnetwork in the foreign network, that is to say that subnetwork in the foreign network which provides the same services, for example, roaming can be facilitated in foreign networks. This assignment can be effected, for example, via look-up tables which can be stored in the base station 331, the respective identification entity 309, 313 or the management entity 319.

The communication connection 308 via the first subnetwork 307 can be established by means of the first identification entity 309; the communication connection 310 via the second subnetwork 311 can be established by means of the second identification entity 313. The communication connection 318 via the nth subnetwork 315 can be established by means of the nth identification entity 317. Alternatively, these communication connections 308, 310, 318 can also be established with the aid of the communication terminal 301.

Figure 4:
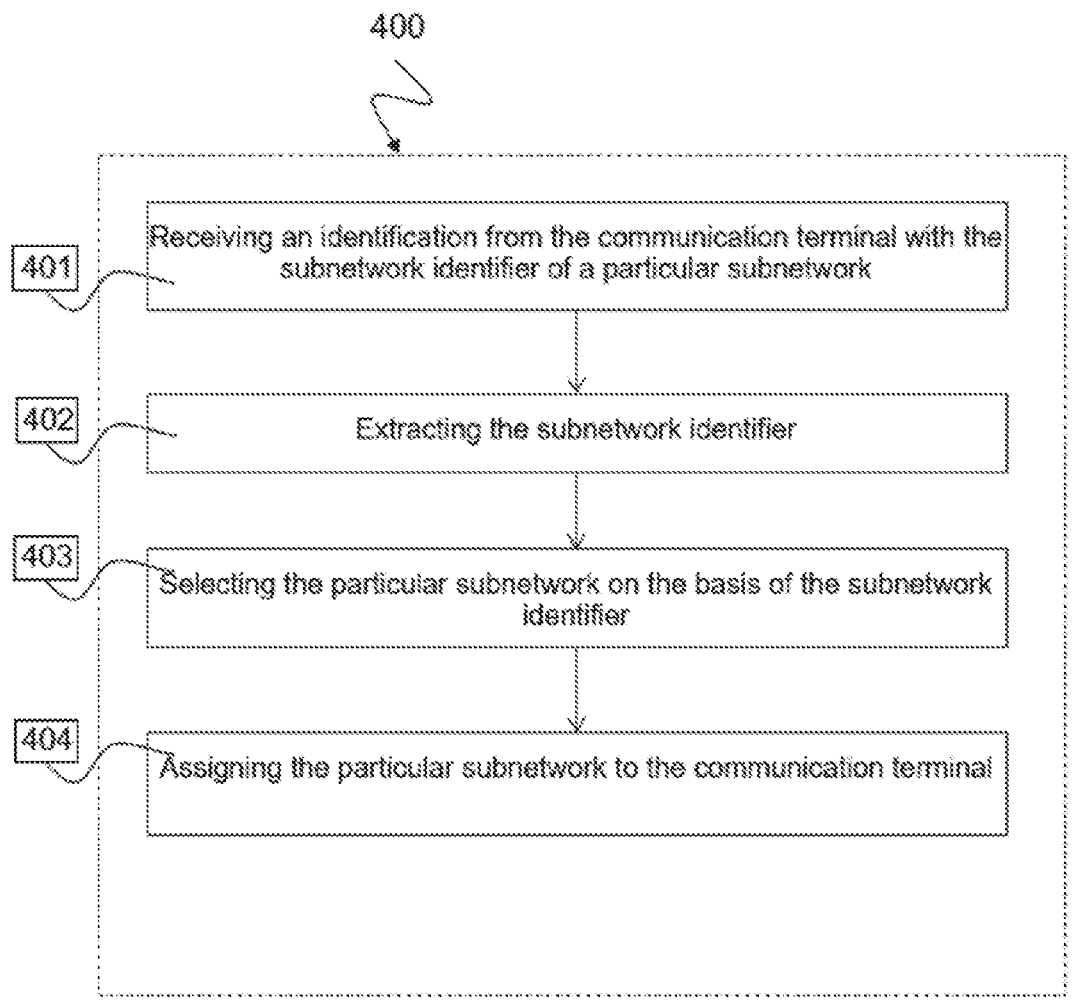
FIG. 4 shows a schematic illustration of a method 400 for assigning a subnetwork to a communication terminal in a communication network having a plurality of subnetworks according to an embodiment of the invention.

FIG. 4 shows a schematic illustration of a method 400 for assigning a subnetwork to a communication terminal in a communication network having a plurality of subnetworks, wherein a subnetwork identifier is assigned to each subnetwork according to one exemplary embodiment.

The communication network can correspond to the communication network 303 described above with respect to FIG. 3. That is to say, the communication network 303 comprises a plurality of subnetworks 307, 311, 315 having a first subnetwork 307 and a second subnetwork 311. A first identification entity 309 for identifying the communication terminal 301 is arranged in the first subnetwork 307 and a second identification entity 313 for identifying the communication terminal 301 is arranged in the second subnetwork 311. A subnetwork identifier is assigned to each subnetwork 307, 311, 315 of the communication network 303. A management entity 319 is arranged in the communication network 303 and manages an assignment 321 of the communication terminal 301 to one of the two subnetworks 307, 311.

The method 400 comprises receiving 401 an identification 302 from the communication terminal 301, wherein the identification 302 comprises a subnetwork identifier 306 of a particular subnetwork of the communication network 303.

The method 400 also comprises extracting 402 the subnetwork identifier from the received identification 302.

The method 400 also comprises selecting 403 the particular subnetwork 307 from the plurality of subnetworks 307, 311, 315 of the communication network 303 on the basis of the extracted subnetwork identifier 306.

The method 400 also comprises assigning 404 the particular subnetwork 307 to the communication terminal 301 for communicating in the communication network 303.

The method 400 may also comprise establishing an end-to-end communication connection of the communication terminal 301 via the particular subnetwork 307.

The communication network 303 may be a network of a fifth generation (5G) or of a further generation, for example as described above with respect to FIGS. 1 and 2. The subnetworks 307, 311, 315 may be slices of the communication network 303, for example as described above with respect to FIG. 2.

The identification 302 may comprise one or more of the following identifications: an International Mobile Subscriber Identity (IMSI), wherein the subnetwork identifier 306 is arranged in the Mobile Subscriber Identification Number field or in the Mobile Network Code field of the IMSI; an eID containing the subnetwork identifier 306 in an eSIM in the communication terminal 301; a network identifier of the communication network 303 containing the subnetwork identifier 306; an International Mobile Station Equipment Identity containing the subnetwork identifier 306.

The communication network 303 may contain a base station 331, for example as described above with respect to FIG. 3, which controls communication via the subnetworks 307, 311, 315 of the communication network 303. The steps of receiving 401 the identification 302, extracting 402 the subnetwork identifier 306, selecting 403 the particular subnetwork 307 and assigning 404 the particular subnetwork 307 to the communication terminal 301 can be carried out by the base station 331.

Each subnetwork 307, 311, 315 may contain an identification entity 309, 313, 317 for identifying the communication terminal 301, which identification entity is connected to the base station 331 using communication technology, as described above with respect to FIG. 3. The method may also comprise forwarding the received identification 302 from the base station 331 to the identification entity 309 of the particular subnetwork 307; and identifying the communication terminal 301 by means of the identification entity 309 of the particular subnetwork 307.

The communication network 303 may contain a management entity 319, for example as described in FIG. 3, which manages communication via the subnetworks 307, 311, 315 of the communication network 303. The identification entity 309 of the particular subnetwork 307 can forward the identification of the communication terminal 301 to the management entity 319. The management entity 319 can authenticate the communication terminal 301 for communicating via the particular subnetwork 307.

After the communication terminal 301 has been authenticated for communicating via the particular subnetwork 307, a communication connection 308 of the communication terminal 301 can be established via the particular subnetwork 307 by means of the identification entity 309 of the particular subnetwork 307, for example as described in FIG. 3.

Figure 5:
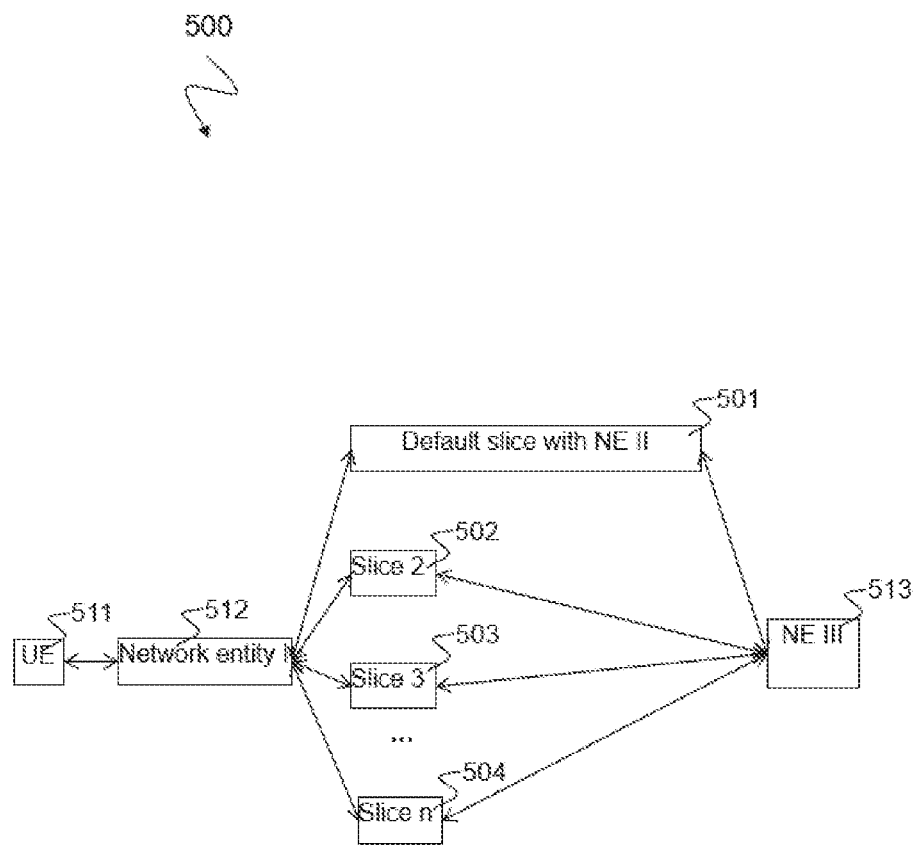
FIG. 5 shows a schematic illustration of the process of registering a communication terminal in a communication network using the example of a 5G network 500 according to an embodiment of the invention.

FIG. 5 shows a schematic illustration of the process of registering a communication terminal in a communication network using the example of a 5G network 500 according to one exemplary embodiment. The 5G network 500 comprises a UE 511, first network entity 512, a plurality of slices 501, 502, 503, 504, each of which is assigned a second network entity, and a third network entity 513. The UE (User Equipment) is an example of a communication terminal 301 as described above with respect to FIGS. 3 and 4. The first network entity 512 can correspond to the first communication node described above with respect to FIG. 3. It may be, for example, an eNodeB or a base station. The slices 501, 502, 503, 504 may correspond to the subnetworks 307, 311, 315 described above with respect to FIGS. 3 and 4 or to the network slices 210*b*, 211*b*, 212*b* or entities 210*a*, 211*a*, 212*a* of these network slices described with respect to FIG. 2. The first slice 501 is described here as a default slice, by way of example. Any other of the slices 502, 503, 504 can naturally also be specified as a default slice. The third network entity 513 may correspond to the network entity 319 described above with respect to FIGS. 3 and 4. It may be arranged, for example, in the management and instrumentation level 106 described in FIG. 1. The third network entity 513 may also perform, inter alia, the tasks of an HSS according to LTE terminology. The respective second network entities assigned to the slices 501, 502, 503, 504 may also perform, inter alia, the tasks of an MME according to LTE terminology.

In one embodiment, the structure of the 5G network 500 is similar to the structure of an LTE network. However, the home network has a plurality of subnetworks 501, 502, 503, 504 which are referred to as slices. The UE is therefore assigned not only to the home network (via the third network entity 513, comparable to the HSS) but also to the respective slice. In analogy to an MME according to LTE terminology, the second network entities can simultaneously be part of the default slice 501, which is dependent on the exact function. The subnetworks 501, 502, 503, 504 can then each have a connection to the third network entity 513 in analogy to the HSS according to LTE, as illustrated here in FIG. 5.

An exemplary process of registering in the 5G network 500 is described below.

The UE 511 is connected to the second network entity of a particular slice 501 via the first network entity 512 on the basis of a subnetwork identifier 306 contained in the identification 302 of the communication terminal 301. The second network entity of the default slice 501 identifies the UE 511 on the basis of the IMSI or a temporary identification feature linked thereto and passes the request from the UE 511 to register in the network to the third network entity 513. In one preferred embodiment, the UE or communication terminal concomitantly sends a subnetwork identifier from the outset, with the result that there is no need for a default slice. In another embodiment, a default slice is used if the subnetwork identifier is not recognized by the base station because it is a new inbound roamer with an identifier which is still unknown, for example.

The third network entity 513 first of all creates parameters which are required for authentication and subsequently for security-relevant processes such as encryption and protection of the integrity of the messages. These parameters are a random value RAND, a key $K_{ASME}$, the expected result of the authentication check XRES and the authentication token AUTN. These four parameters are sent from the third network entity 513 to the second network entity of the default slice 501 as a so-called authentication vector. RAND and AUTN are transmitted from the second network entity of the default slice 501 to the UE 511 via the first network entity 512. The UE 511 can likewise derive some parameters, for example the $K_{ASME}$, from a secret key stored on the UICC, which parameters allow the UE to check the authenticity of the network with the aid of the AUTN and to calculate the value RES from RAND and $K_{ASME}$ using a particular algorithm. This value is sent to the second network entity of the default slice 501 via the first network entity 512. If RES and XRES are the same, the second network entity of the default slice 501 sends a message to the third network entity 513 in order to inform the latter that the authentication of the UE 511 has been positively concluded. The third network entity 513 then sends a list of connections permitted for this UE 511, for example PDN (Packet Data Network) Subscription Contexts with QoS (Quality of Service) profiles, to the second network entity of the default slice 501.

The second network entity of the default slice 501 then establishes a default bearer or carrier (for example an IP connection) from the UE 511 to a PDN-GW, for example, via an S-GW, for example, and informs the UE 511 of the successful registration process. The UE 511 can now communicate via the communication network. Further connection requests from the PDN-GW or the UE 511 for additional bearers or modifications of the existing bearers can be authorized by the second network entity of the default slice 501 on the basis of the data received from the third network entity 513.

All subnetworks (slices) 501, 502, 503, 504 are predefined both with regard to the subnetwork structure (that is to say which functionalities are present, which network topology is defined) and with regard to the functionality.

The network entities II (on default slice 501) and III 513 are assigned to the control plane. The network entity I 512 is assigned to both the control plane and the user plane; for example, the signaling between the network entity I 512 and the network entity II (on default slice 501) can take place on the control plane (CP), whereas the user data can run between the network entity I 512 and the S-GW and PDN-GW on the user plane (UP). The subnetworks 501, 502, 503, 504 logically converge in the network entity III 513. In any case, there is the following two-stage process:

a) The UE 511 attempts to register itself, is fully authenticated by the network entities II and III 513, as described above, and is either allocated to another slice or is left in the particular slice 501. This particular slice 501 may be a standard multimedia broadband network in one configuration.

b) If the UE 511 is allocated to another slice, the network entity I 512 repeats the registration process in the direction of the allocated slice (and the network entity II therein) and, if successful, the UE 511 is deregistered from the default slice 501.

In terms of the sequence, this can correspond, for example, to a tracking area update according to LTE terminology, that is to say the method which is carried out when the UE 511 comes from the area of an MME/S-GW into that of another MME/S-GW, but, in contrast to this (where the eNodeB of a network is connected only to an MME), the network entity I 512 can select another network entity II on the basis of the subnetwork identifier.

In one implementation form, the UE 511 can be authenticated in a) or b) or in a) and b). This can be configured, for instance, in a similar manner to the tracking area update described above.

The network entity III 513 identifies the UE 511 on the basis of the IMSI, for example, and assigns the associated slice, for example subnetwork I 501, to the UE 511. The slice is allocated on the basis of the data stored in the network entity III and possibly with the inclusion of parameters transmitted to the network entity II when registering the UE 511. These may be hardware identifiers (for example the IMEI), operating system information or application IDs.

In an alternative variant, the UE 511 transmits the identifier of the corresponding subnetwork in the second step b). This is the identifier which it has received from the network entity III via the network entity II in the first step a). The UE 511 then repeats the registration process in the direction of the allocated slice in step b). That is to say, in this alternative, the slices converge in the UE 511, and not in the network entity I 512.

In this alternative variant, instead of its own ID (for example IMSI), in step b) the UE 511 can then give its own ID with the slice ID, which it has received from the network entity III via the network entity II in the first step a), during the connection establishment. The correct network entity II can therefore always be selected and the network entity I 512 need not store any status with regard to the UE 511 and the UE 511 may also be part of a plurality of slices. This also simplifies the procedures when changing the network entity I 512.

The subnetwork can contain, for example, an S-GW (analog), a PDN-GW (analog) etc. These network entities are parameterized for the UE 511. This is carried out via the network entity II when necessary—if, for example, a new bearer is established.

After the slice has been allocated and registration in the latter has been carried out, the network entity II which served as a first contact point for the registration is no longer incorporated in the signaling flow (apart from the fact that the UE 511 remains in the particular slice 501 and the network entity II is part of the particular slice 501).

After the parameterization, the UE 511 can communicate via the subnetwork I 501, for example in the Internet, or can register in the IMS and can use telecommunications services (for example telephony).

The subnetworks I to n 501, 502, 503, 504 are decoupled from one another.

The above concept similarly applies to the registration in a foreign network. Here, the network entity III similarly selects the subnetwork and the parameters. In the foreign network, the network entity II in the network visited will select that predefined subnetwork of the foreign network which corresponds to the home subnetwork (for example using a look-up table).

Embodiments of the invention further provide computer program products which can be directly loaded into the internal memory of a digital computer and comprises software code sections which can be used to carry out the method 400 described with respect to FIG. 4 or the processes described with respect to FIGS. 3 and 5 when the product runs on a computer. The computer program products can be stored on a non-transitory medium suitable for a computer and can comprise computer-readable program means which cause a computer to carry out the method 400 or to implement or control the network components of the communication networks described in FIGS. 1 to 5.

The computer may be a PC, for example a PC of a computer network. The computer may be implemented as a chip, an ASIC, a microprocessor or a signal processor and may be arranged in a computer network, for example in a communication network as described in FIGS. 1 to 5.

It goes without saying that the features of the various embodiments described by way of example herein can be combined with one another unless specifically stated otherwise. As described in the description and the drawings, individual elements which have been illustrated as being connected need not be directly connected to one another; intermediate elements may be provided between the connected elements. It also goes without saying that embodiments of the invention can be implemented in individual circuits, partially integrated circuits or fully integrated circuits or programming means. The term "for example" is only meant as an example and not as the best or optimum case. Particular embodiments have been illustrated and described herein, but it is obvious to a person skilled in the art that a multiplicity of alternative and/or identical implementations can be implemented instead of the embodiments shown and described without departing from the concept of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100: 5G system architecture
101: Access device, communication terminal, UE
102: Access technology
103: Application layer
104: Activation layer
105: Infrastructure and resource layer
106: Management and instrumentation layer
200: 5G communication network having a plurality of slices
210a: First slice entity
210b: First network slice
211a: Second slice entity
211b: Second network slice
212a: Third slice entity
212b: Third network slice
213: Slice composition
221: Abstracted objects
222: Virtual network functions
223: Combined objects
224: Aggregated objects
225: Object library
231: Access node
232: Access node
233: Access node
234: Virtual network node
235: Virtual network node
236: Virtual network node
237: Virtual network node
238: Computer node
239: Computer node
240: Computer node
251: Infrastructure services
300: Communication system
301: Communication terminal, for example UE
302: Identification of the communication terminal
303: Communication network
304: Connection between the first subnetwork and the management entity
305: Communication interface
306: Subnetwork identifier of the communication terminal
307: First subnetwork
308: Connection establishment via the first subnetwork
309: First identification entity
310: Connection establishment via the second subnetwork 311: Second subnetwork
312: First subnetwork identifier
313: Second identification entity
314: Second subnetwork identifier
315: nth subnetwork
316: nth subnetwork identifier
317: nth identification entity
318: Connection establishment via the nth subnetwork
319: Management entity
321: Assignment of the communication terminal to the subnetwork identifier
331: Base station
335: Communication interface
337: Processor
339: Hardware circuit
400: Method for assigning a subnetwork to a communication terminal
401: First step: receiving
402: Second step: extracting
403: Third step: selecting
404: Fourth step: assigning
500: 5G communication network
501: Default slice with network entity II or second network entity
502: Slice 2
503: Slice 3
504: Slice n
511: UE or communication terminal
512: First network entity or network entity I
513: Third network entity or network entity III

The invention claimed is:

1. A method for assigning a subnetwork to a communication terminal in a communication network having a plurality of subnetworks, wherein a subnetwork identifier is assigned to each subnetwork, the method comprising:
receiving, by a base station of the communication network, an identification from the communication terminal, wherein the identification comprises a subnetwork identifier of a particular subnetwork of the communication network;
extracting, by the base station, the subnetwork identifier from the received identification;
selecting, by the base station, the particular subnetwork from the plurality of subnetworks of the communication network based on the extracted subnetwork identifier; and
assigning, by the base station, the particular subnetwork to the communication terminal for communicating in the communication network;
wherein each subnetwork contains a respective identification entity for identifying the communication terminal, wherein each respective identification entity is connected to the base station, and wherein the method further comprises: forwarding, by the base station, the received identification from the base station to an identification entity of the particular subnetwork to facilitate the identification entity of the particular subnetwork identifying the communication terminal;
wherein the communication network contains a management entity which manages communication via the subnetworks of the communication network, wherein the identification entity of the particular subnetwork forwards the identification of the communication terminal to the management entity, and wherein the management entity authenticates the communication terminal for communicating via the particular subnetwork.

2. The method as claimed in claim 1, further comprising: establishing an end-to-end communication connection of the communication terminal via the particular subnetwork.

3. The method as claimed in claim 1, wherein the communication network is a network of a fifth generation (5G) or of a further generation, and wherein the subnetworks are slices of the communication network.

4. The method as claimed in claim 1, wherein the identification comprises at least one of the following:
an International Mobile Subscriber Identity (IMSI), wherein the subnetwork identifier is arranged in a Mobile Subscriber Identification Number field or in a Mobile Network Code field of the IMSI;
an embedded identifier (eID) containing the subnetwork identifier in an embedded subscriber identity module (eSIM) in the communication terminal;
a network identifier of the communication network containing the subnetwork identifier; or
an International Mobile Station Equipment Identity containing the subnetwork identifier.

5. The method as claimed in claim 1, wherein the base station controls communication via the subnetworks of the communication network.

6. The method as claimed in claim 1, wherein, after the communication terminal has been authenticated for communication via the particular subnetwork, a communication connection of the communication terminal is established via the particular subnetwork by the identification entity of the particular subnetwork.

7. A base station for communicating via a plurality of subnetworks of a communication network, wherein a subnetwork identifier is assigned to each subnetwork, the base station comprising:
a communication interface configured to receive an identification from the communication terminal, wherein the identification comprises a subnetwork identifier of a particular subnetwork of the communication network; and
a processor configured to:
extract the subnetwork identifier from the received identification;
select the particular subnetwork from the plurality of subnetworks of the communication network; and
assign the particular subnetwork to the communication terminal for communicating in the communication network;
wherein each subnetwork contains a respective identification entity for identifying the communication terminal, wherein the base station is connected to each respective identification entity, and wherein the communication interface is further configured to: forward the received identification to an identification entity of the particular subnetwork to facilitate the identification entity of the particular subnetwork identifying the communication terminal and forwarding the identification of the communication terminal to a management entity for authentication of the communication terminal to communicate via the particular subnetwork.

8. The base station as claimed in claim 7, wherein the processor is configured to select the particular subnetwork from the plurality of subnetworks on the basis of a look-up table.

9. The method as claimed in claim 1, further comprising:
creating, by the management entity, parameters for authentication of the communication terminal.

10. The method as claimed in claim 9, wherein the parameters for authentication of the communication terminal include a random value, a key, an expected result of an authentication check, and an authentication token.

11. The method as claimed in claim 10, further comprising:
    transmitting, from the identification entity of the particular subnetwork via the base station to the communication terminal, the random value and the authentication token;
    deriving, by the communication terminal, the key from a secret key; and
    checking, by the communication terminal, authenticity of the communication network based on the authentication token and based on calculating an authentication check value from the random value and the key.

12. The method as claimed in claim 11, further comprising:
    sending, by the communication terminal, the authentication check value to the identification entity of the particular subnetwork via the base station; and
    in response to the authentication check value and the expected result of the authentication check being the same, sending, by the identification entity of the particular subnetwork, a message to the management entity indicating successful authentication of the communication terminal.

13. The method as claimed in claim 12, further comprising:
    receiving, by the identification entity of the particular subnetwork, a list of permitted connections for the communication terminal.

14. The method as claimed in claim 13, further comprising:
    establishing, by the identification entity of the particular subnetwork, a default carrier from the communication terminal to a Packet Data Network Gateway (PDN-GW); and
    informing, by the identification entity of the particular subnetwork, the communication terminal regarding successful registration.

15. A system, comprising:
    a communication terminal;
    a base station of a communication network having a plurality of subnetworks, wherein a subnetwork identifier is assigned to each subnetwork;
    a plurality of identification entities, wherein each subnetwork contains a respective identification entity for identifying the communication terminal, wherein each respective identification entity is connected to the base station; and
    a management entity configured to manage communication via the subnetworks of the communication network;
    wherein the base station is configured to:
        receive an identification from the communication terminal, wherein the identification comprises a subnetwork identifier of a particular subnetwork of the communication network;
        extract the subnetwork identifier from the received identification;
        select the particular subnetwork from the plurality of subnetworks of the communication network based on the extracted subnetwork identifier; and
        assign the particular subnetwork to the communication terminal for communicating in the communication network;
    wherein the base station is further configured to forward the received identification from the base station to an identification entity of the particular subnetwork
    wherein the identification entity of the particular subnetwork is configured to:
        identify the communication terminal; and
        forward the identification of the communication terminal to the management entity;
    wherein the management entity is configured to authenticate the communication terminal for communicating via the particular subnetwork.

* * * * *